(12) United States Patent
Tanaka

(10) Patent No.: US 12,080,847 B2
(45) Date of Patent: Sep. 3, 2024

(54) ALL-SOLID-STATE BATTERY

(71) Applicant: TDK CORPORATION, Tokyo (JP)

(72) Inventor: Kazumasa Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 559 days.

(21) Appl. No.: 17/416,821

(22) PCT Filed: Dec. 24, 2019

(86) PCT No.: PCT/JP2019/050536
§ 371 (c)(1),
(2) Date: Jun. 21, 2021

(87) PCT Pub. No.: WO2020/138040
PCT Pub. Date: Jul. 2, 2020

(65) Prior Publication Data
US 2022/0059869 A1    Feb. 24, 2022

(30) Foreign Application Priority Data
Dec. 25, 2018    (JP) ................... 2018-240461

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/505* (2013.01);
(Continued)

(58) Field of Classification Search
CPC .. H01M 10/0562; H01M 4/131; H01M 4/505; H01M 4/525; H01M 10/0525;
(Continued)

(56) References Cited

U.S. PATENT DOCUMENTS

2007/0231704 A1   10/2007   Inda
2007/0259271 A1   11/2007   Nanno et al.
(Continued)

FOREIGN PATENT DOCUMENTS

JP   2007-005279 A   1/2007
JP   2007-294429 A   11/2007
(Continued)

OTHER PUBLICATIONS

Mar. 3, 2020 International Search Report issued in International Patent Application No. PCT/JP2019/050536.
(Continued)

*Primary Examiner* — Amanda C. Walke
(74) *Attorney, Agent, or Firm* — Oliff PLC

(57) ABSTRACT

An all-solid-state battery in which cracking attributed to expansion and contraction of the volume is suppressed. An all-solid-state battery according to is a laminated body including a battery element in which a positive electrode layer including a positive electrode current collector layer and a positive electrode active material layer and a negative electrode layer including a negative electrode current collector layer and a negative electrode active material layer are formed on a solid electrolyte layer, at one end of the positive electrode layer and the negative electrode layer extend and a non-extending region on a lateral face of the laminated body, and a margin layer is formed on the same plane as each of the positive electrode layer or the negative electrode layer and includes a void to one of the positive electrode layer or the negative electrode layer does not extend on an end of the laminated body.

6 Claims, 4 Drawing Sheets

(51) Int. Cl.
*H01M 4/505* (2010.01)
*H01M 4/525* (2010.01)
*H01M 10/0525* (2010.01)
*H01M 10/0585* (2010.01)
*H01M 50/533* (2021.01)

(52) U.S. Cl.
CPC ....... *H01M 4/525* (2013.01); *H01M 10/0525* (2013.01); *H01M 10/0585* (2013.01); *H01M 50/533* (2021.01)

(58) Field of Classification Search
CPC ........... H01M 10/0585; H01M 50/533; H01M 50/548; H01M 4/13; H01M 50/528; Y02E 60/10; Y02P 70/50
See application file for complete search history.

(56) References Cited

U.S. PATENT DOCUMENTS

2008/0081257 A1* 4/2008 Yoshida ............ H01M 10/0562
429/209
2018/0342710 A1* 11/2018 Yoon ................... H01M 50/193
2019/0131603 A1* 5/2019 Park .................... H01M 50/489
2019/0252720 A1* 8/2019 Sato ...................... H01M 4/136
2021/0305665 A1* 9/2021 Koga ................. H01M 50/531

FOREIGN PATENT DOCUMENTS

| JP | 2008-078119 A | | 4/2008 |
| JP | 2011-204511 A | | 10/2011 |
| JP | 2012049067 A | * | 3/2012 |
| WO | 2013/175993 A1 | | 11/2013 |
| WO | 2018/092484 A1 | | 5/2018 |

OTHER PUBLICATIONS

Translation of Apr. 23, 2023 Office Action issued in Chinese Patent Application No. 201980085441.7.
Translation of Jan. 23, 2024 Office Action issued in Japanese Patent Application No. 2020-563288.

* cited by examiner

ALL-SOLID-STATE BATTERY

TECHNICAL FIELD

The present disclosure relates to an all-solid-state battery.
Priority is claimed on Japanese Patent Application No. 2018-240461, filed in Japan on Dec. 25, 2018, the content of which is incorporated herein by reference.

BACKGROUND ART

In recent years, developments in electronics technology have been significant, and the size reduction, weight reduction, thickness reduction, and multi-functionalization of mobile electronic devices have been achieved. Accordingly, for batteries that serve as power sources of electronic devices, there is a strong demand for size reduction, weight reduction, thickness reduction, and reliability improvement. At the moment, in lithium ion secondary batteries that are versatilely used, electrolytes (electrolytic solutions) such as organic solvents have been thus far used as media for ion migration. However, in batteries having the above-described configuration, there is a risk that electrolytic solutions may leak. In addition, since organic solvents or the like that are used in electrolytic solutions are flammable substances, there is a demand for safer batteries.

Therefore, as one of measures for enhancing the safety of batteries, the use of solid electrolytes as electrolytes, instead of electrolytic solutions, has been proposed. Furthermore, development of all-solid-state batteries in which a solid electrolyte is used as an electrolyte and the other configuration elements are also solid is underway.

For example, Japanese Unexamined Patent Application, First Publication No. 2007-5279 (hereinafter, Patent Literature 1) proposes an all-solid-state lithium secondary battery in which an inflammable solid electrolyte is used and thus all configuration elements are solid. It is disclosed that this all-solid-state lithium secondary battery includes an active material layer and a solid electrolyte layer joined to the active material layer by sintering, the active material layer contains a first crystalline substance capable of emitting and absorbing lithium ions, and the solid electrolyte layer contains a second crystalline substance having lithium ion conductivity. In addition, it is described that the filling rate of the solid electrolyte layer preferably exceeds 70%.

On the other hand, Japanese Unexamined Patent Application, First Publication No. 2007-294429 (hereinafter, Patent Literature 2) describes a lithium ion-conductive solid electrolyte that is produced by firing a compact containing inorganic powder and has a porosity of 10 vol % or less.

As described in Patent Literature 1 and Patent Literature 2, ordinarily, it is considered to be preferable that solid electrolytes that configure all-solid-state batteries are dense. However, in our intensive studies, there was a case where, in all-solid-state batteries including a densified solid electrolyte layer, due to the expansion and contraction of the volume of an electrode layer occurring at the time of firing during the manufacturing of the all-solid-state batteries or at the time of the charge and discharge of the all-solid-state batteries, internal stress concentrated in the solid electrolyte layer, and cracks were generated. As a result, it was found that the internal resistance increased and the cycle characteristics became deteriorated.

Concerning such a problem, International Publication WO 2013/175993 (hereinafter, Patent Literature 3) describes a solid electrolyte layer in which a portion having a low void ratio is formed in a region near an electrode layer of the solid electrolyte layer and a portion having a high void ratio is formed in a region apart from the electrode layer. However, in our intensive studies, when a portion having a high porosity and a portion having a low porosity were formed in a solid electrolyte layer as described in Patent Literature 3, conversely, the internal resistance of the solid electrolyte layer increased, and it was not possible to obtain sufficient cycle characteristics.

CITATION LIST

Patent Literature

[Patent Literature 1]
Japanese Unexamined Patent Application, First Publication No. 2007-5279
[Patent Literature 2]
Japanese Unexamined Patent Application, First Publication No. 2007-294429
[Patent Literature 3]
International Publication WO 2013/175993

SUMMARY OF DISCLOSURE

Technical Problem

The present disclosure has been made in order to solve the above-described problem and provides an all-solid-state battery having excellent cycle characteristics.

Solution to Problem

An all-solid-state battery according to the present disclosure includes a laminated body including a battery element in which a positive electrode layer including a positive electrode current collector layer and a positive electrode active material layer and a negative electrode layer including a negative electrode current collector layer and a negative electrode active material layer are formed on one or both main surfaces of a solid electrolyte layer, a positive electrode outer electrode, and a negative electrode outer electrode, the positive electrode layer and the negative electrode layer each include one extending end on a lateral face of the laminated body and a non-extending region on lateral faces of the laminated body, are each connected to the positive electrode outer electrode and the negative electrode outer electrode through the respective extending ends, and each include a void adjacent at least to the non-extending regions.

The void may be adjacent to at least one of the positive electrode current collector layer and the negative electrode current collector layer.

In addition, the laminated body may include a margin layer provided on the same planes as each of the positive electrode layer and the negative electrode layer and the void is provided in at least a part of the margin layer.

Furthermore, in a cross section which is the same direction as a lamination direction of the laminated body and parallel to the extending end, when an average cross-sectional area of the void is represented by $S_x$, and an average cross-sectional area of the positive electrode current collector layer or an average cross-sectional area of the negative electrode current collector layer is represented by $S_y$, an $S_x/S_y$ ratio may satisfies 0.0001 to 0.02.

Furthermore, the $S_x/S_y$ ratio may satisfies 0.0006 to 0.008.

Advantageous Effects of Disclosure

According to the present disclosure, it is possible to provide an all-solid-state battery in which stress loading attributed to volume expansion is absorbed and, consequently, the cycle characteristics are excellent.

DESCRIPTION OF EMBODIMENTS

Figure 1:
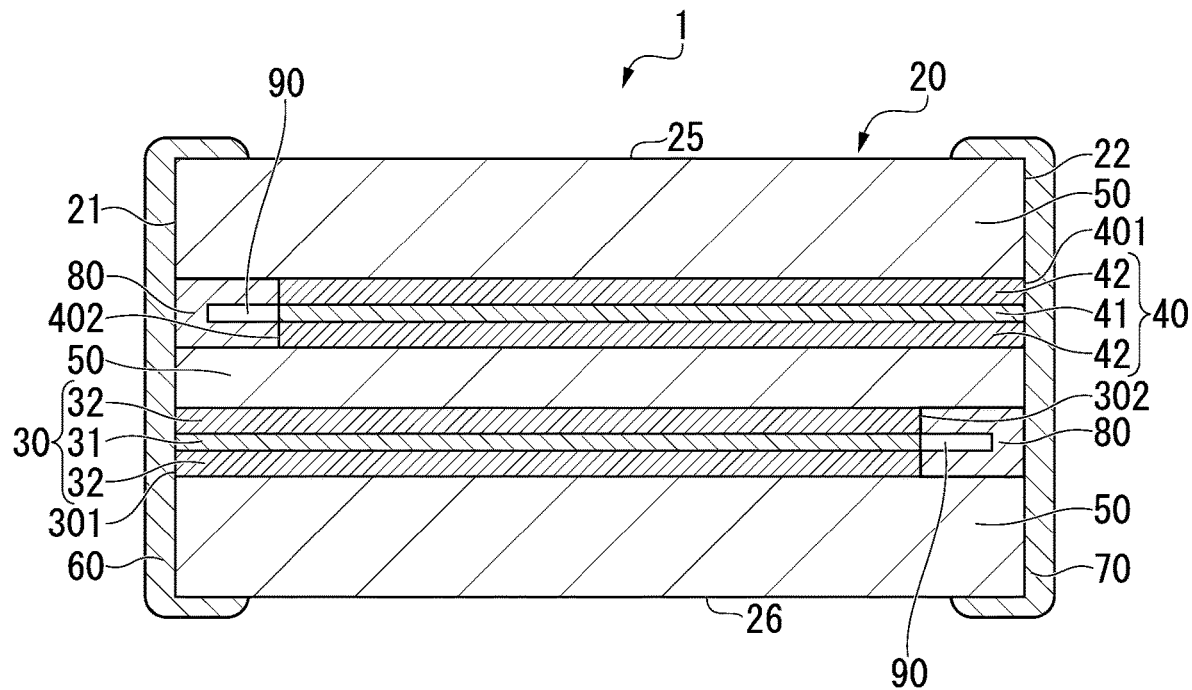
FIG. 1 is a cross-sectional view parallel to a third lateral face 23 showing the configuration of an all-solid-state battery according to a first embodiment of the present disclosure.

Hereinafter, an all-solid-state battery of the present disclosure will be described in detail with reference to the drawings. In the drawings to be used in the following description, there is a case where a characteristic portion is shown in an enlarged manner for convenience in order to facilitate the understanding of the characteristics of the present embodiment. Therefore, the dimensional ratio and the like of each configuration element shown in the drawings are different from actual ones in some cases. A material, a dimension, and the like exemplified in the following description are simply examples, and the present disclosure is not limited thereto and can be appropriately modified and carried out within the scope of the gist of the present disclosure.

First Embodiment

First, an all-solid-state battery according to a first embodiment of the present disclosure will be described.

Figure 2:
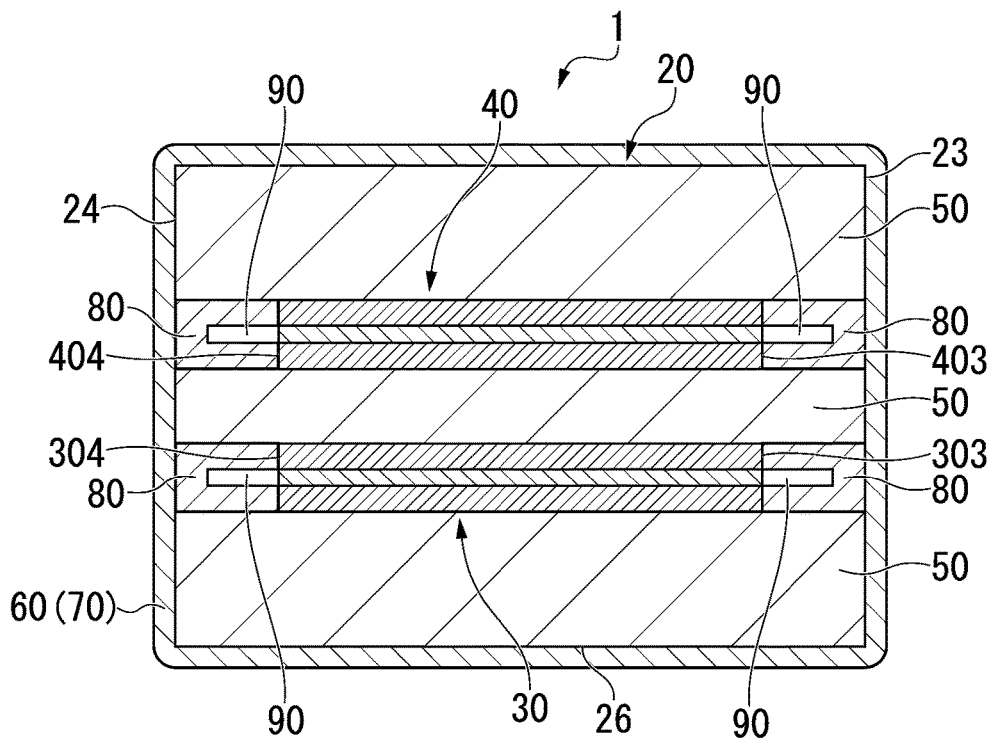
FIG. 2 is a cross-sectional view parallel to a first lateral face 21 showing the configuration of the all-solid-state battery according to the first embodiment of the present disclosure.

As shown in FIG. 1 and FIG. 2, an all-solid-state battery 1 includes a laminated body 20 in which a positive electrode layer 30 and a negative electrode layer 40 are laminated across a solid electrolyte layer 50. A battery element in which the positive electrode layer 30 and the negative electrode layer 40 are formed on one or both surface(s) of the solid electrolyte layer 50 configures at least a part of the laminated body 20. The positive electrode layer 30 has a positive electrode current collector layer 31 and positive electrode active material layers 32. The negative electrode layer 40 has a negative electrode current collector layer 41 and negative electrode active material layers 42. Margin layers 80 are formed on the same planes of the positive electrode layer 30 and the negative electrode layer 40. The laminated body 20 is a hexahedron and has four lateral faces formed as surfaces parallel to a lamination direction (a first lateral face 21, a second lateral face 22, a third lateral face 23, and a fourth lateral face 24), and an upper surface 25 and a lower surface 26 formed as surfaces orthogonal to the lamination direction. The positive electrode current collector layer is exposed on the first lateral face 21, and the negative electrode current collector layer is exposed on the second lateral face 22. The third lateral face 23 is a lateral face on the right side when seen from the first lateral face 21 side with the upper surface 25 positioned above. The fourth lateral face 24 is a lateral face on the left side when seen from the first lateral face 21 side with the upper surface 25 positioned above. In addition, the first lateral face 21 and the second lateral face 22 are opposite to each other, and the third lateral face 23 and the fourth lateral face 24 are opposite to each other.

In the following descriptions in the specification, any one or both of a positive electrode active material and a negative electrode active material will be collectively referred to as an active material, any one or both of the positive electrode active material layer 32 and the negative electrode active material layer 42 will be collectively referred to as the active material layer, any one or both of the positive electrode current collector layer 31 and the negative electrode current collector layer 41 will be collectively referred to as the current collector layer, and any one or both of the positive electrode layer 30 and the negative electrode layer 40 will be collectively referred to as the electrode layer.

As shown in FIG. 1 and FIG. 2, the positive electrode layer 30 is formed in a substantially rectangular shape when seen from the upper surface 25 and includes four ends. The four ends are a first end 301 and a second end 302 that are opposite to each other and a third end 303 and a fourth end 304 that are, similarly, opposite each other. Among these, the first end 301 is exposed (extends) on the first lateral face 21 of the laminated body 20. In addition, the second end 302, the third end 303, and the fourth end 304 are not exposed (do not extend) on the lateral faces of the laminated body 20 and are formed substantially parallel to the second lateral face 22, the third lateral face 23, and the fourth lateral face 24 of the laminated body 20, respectively. In the present embodiment, hereinafter, the first end 301 will be referred to as the "extending end", and the second end 302, the third end 303, and the fourth end 304 will be referred to as the "non-extending regions".

Similar to the positive electrode layer 30, the negative electrode layer 40 is formed in a substantially rectangular shape when seen from the upper surface 25 and includes four ends. The four ends are a first end 401 and a second end 402 that are opposite to each other and a third end 403 and a fourth end 404 that are, similarly, opposite each other. Among these, the first end 401 is exposed (extends) on the second lateral face 22 of the laminated body 20. In addition, the second end 402, the third end 403, and the fourth end 404 are not exposed (do not extend) on the lateral faces of the laminated body 20 and are formed substantially parallel to the first lateral face 21, the third lateral face 23, and the fourth lateral face 24 of the laminated body 20, respectively. In the present embodiment, hereinafter, the first end 401 will be referred to as the "extending end", and the second end 402, the third end 403, and the fourth end 404 will be referred to as the "non-extending regions".

The margin layers 80 in the all-solid-state battery 1 of the present embodiment are preferably provided to resolve the step between the solid electrolyte layer 50 and the positive electrode layer 30 and the step between the solid electrolyte layer 50 and the negative electrode layer 40. Therefore, the margin layers 80 indicate regions other than the positive electrode layer 30 and the negative electrode layer 40 on the main surfaces of the solid electrolyte layer 50. Since the presence of such margin layers resolves the steps between the solid electrolyte layer 50 and the positive electrode layer 30 and between the solid electrolyte layer 50 and the negative electrode layer 40, the denseness between the solid electrolyte layer 50 and the electrode layer becomes high, and interlayer peeling (delamination) or warpage which is arise from the firing of the all-solid-state battery is less likely to occur.

As shown in FIG. 1, the margin layers 80 are formed on the outer sides of the "non-extending regions" of the positive electrode layer 30 and the negative electrode layer 40. In other words, the margin layers 80 form parts of the lateral faces parallel to, out of the four lateral faces of the laminated body 20, the "non-extending regions", thereby resolving the step between the solid electrolyte layer 50 and the positive electrode layer 30 and the step between the solid electrolyte layer 50 and the negative electrode layer 40.

To the first lateral face 21 of the laminated body 20, a positive electrode outer electrode 60 that is electrically connected to the positive electrode current collector layer 31 is provided. This electrical connection is achieved by the connection of the positive electrode outer electrode 60 with the positive electrode current collector layer 31 exposed on the "extending end" side of the positive electrode layer 30.

To the second lateral face 22 of the laminated body 20, a negative electrode outer electrode 70 that is electrically connected to the negative electrode current collector layer 41 is provided. This electrical connection is achieved by the connection of the negative electrode outer electrode 70 with the negative electrode current collector layer 41 exposed on the "extending end" side of the negative electrode layer 40.

In at least parts of the regions between the margin layers 80 and the "non-extending regions" of the positive electrode layer 30 and the negative electrode layer 40, voids 90 are formed. In the present embodiment, the voids 90 are provided in parts of the regions of the margin layers 80. In other words, the void 90 of the present embodiment is adjacent to the positive electrode current collector layer 31 or the negative electrode current collector layer 41 exposed on the "non-extending regions" and is adjacent to the margin layer 80 in portions excluding the above-described adjacent portion.

Furthermore, the void 90 may be adjacent to at least one of the positive electrode current collector layer 31 and the negative electrode current collector layer 41 in at least the "non-extending regions" as in the present embodiment.

Furthermore, the void 90 may be provided in at least a part of the region of the margin layer 80 as in the present embodiment.

The positive electrode current collector layer 31 or the negative electrode current collector layer 41 includes the positive electrode active material layer(s) 32 or the negative electrode active material layer(s) 42 on one main surface or both main surfaces and thus receives stress loading attributed to the expansion and contraction of the volume in the vertical direction due to the active material layer(s). Due to this stress loading, the positive electrode current collector layer 31 or the negative electrode current collector layer 41 extends in the transverse direction, but includes the void in the form of being adjacent to the "non-extending regions" and is thus capable of absorbing stress caused by the extension in the transverse direction, which enables stress loading exerted on the margin layer 80 in association with charging and discharging to be reduced. Therefore, it is possible to obtain all-solid-state batteries having excellent cycle characteristics compared with the related art.

Furthermore, in a cross section which is the same direction as the lamination direction of the laminated body 20 and parallel to the extending end (a cross section parallel to the first lateral face or the second lateral face), when the average cross-sectional area of the void 90 is represented by $S_x$ and the average cross-sectional area of the positive electrode current collector layer 31 or the average cross-sectional area of the negative electrode current collector layer 41 is represented by $S_y$, the ratio $S_x/S_y$ preferably satisfies 0.0001 to 0.02 and more preferably satisfies 0.0006 to 0.008 in some embodiments.

In addition, in the laminated body 20 of the present embodiment, one positive electrode current collector layer 31 and one negative electrode current collector layer 41 are provided, but the configuration is not limited thereto, and a plurality of positive electrode current collector layers 31 and a plurality of negative electrode current collector layers 41 may be provided.

According to such a configuration, in a case where the ratio $S_x/S_y$ satisfies 0.0001 to 0.02, it is possible to obtain excellent cycle characteristics. When the ratio $S_x/S_y$ is smaller than 0.0001, since no void is included or the void is too small, the stress loading attributed to the expansion and contraction of the volume is not sufficiently relaxed. On the other hand, when the ratio $S_x/S_y$ is larger than 0.02, since the void size is too large, a fine crack is likely to be induced from the void as a point of origin due to the stress loading attributed to the expansion and contraction of the volume. As a result, there is a likelihood that the degradation of the cycle characteristics may be caused.

Furthermore, in a cross section which is the same direction as the lamination direction of the laminated body 20 and perpendicular to the extending end (a cross section parallel to the third lateral face or the fourth lateral face), when the average cross-sectional area of the void 90 is represented by $S_x$ and the average cross-sectional area of the positive electrode current collector layer 31 or the average cross-sectional area of the negative electrode current collector layer 41 is represented by $S_y$, the ratio $S_x/S_y$ preferably satisfies 0.0001 to 0.02 and more preferably satisfies 0.0006 to 0.008 in some embodiments.

(Solid Electrolyte)

The solid electrolyte layer 50 of the all-solid-state battery 1 of the present embodiment contains a solid electrolyte material having a low electron conductivity and a high lithium ion conductivity. It is possible to use an ordinary solid electrolyte material, for example, an oxide-based lithium ion conductor having a NISICON-type, garnet-type, or perovskite-type crystal structure or the like. Specifically, lithium aluminum titanium phosphate preferably contains at least one selected from the group consisting of ($Li_{1+x}Al_xTi_{2-x}(PO_4)_3$ (0≤x≤0.6)), $Li_{3+x1}Si_{x1}P_{1-x1}O_4$ (0.4≤x≤0.6), $Li_{3.4}V_{0.4}Ge_{0.6}O_4$, lithium germanium phosphate ($LiGe_2(PO_4)_3$), $Li_2OV_2O_5$—$SiO_2$, $Li_2O$—$P_2O_5$—$B_2O_3$, $Li_3PO_4$, $Li_{0.5}La_{0.5}TiO_3$, $Li_{14}Zn(GeO_4)_4$, and $Li_7La_3Zr_2O_{12}$.

As the solid electrolyte material of the present embodiment, the lithium ion conductor having a NASICON-type crystal structure may be used, and, for example, a solid electrolyte material represented by $LiTi_2(PO_4)_3$ (LTP), $LiZr_2(PO_4)_3$ (LZP), $Li_{1+x}Al_xTi_{2-x}(PO_4)_3$ (LATP, 0<x≤0.6)), $Li_{1+x}Al_xGe_{2-x}(PO_4)_3$ (LAGP, 0<x≤0.6), or $Li_{1+x}Y_xZr_{2-x}(PO_4)_3$ (LYZP, 0<x≤0.6) may be contained.

In addition, the solid electrolyte layer 50 may be selected in accordance with the active materials that are used for the positive electrode layer 30 and the negative electrode layer 40. For example, the solid electrolyte layer 50 may contain the same element as the element that forms the active materials. When the solid electrolyte layer 50 contains the same element as the element that forms the active materials, the positive electrode active material layer 32 and the negative electrode active material layer 42 are strongly joined to the solid electrolyte layer 50 at the interfaces. In addition, it is possible to increase the contact areas in the interfaces between the positive electrode active material layer 32 and the solid electrolyte layer 50 and between the negative electrode active material layer 42 and the solid electrolyte layer 50.

The positive electrode active material layer 32 and the negative electrode active material layer 42 each contain a positive electrode active material or a negative electrode active material that exchanges electrons with lithium ions. Additionally, the positive electrode active material layer 32 and the negative electrode active material layer 42 each may contain a conductive assistant, a conductive ion auxiliary agent, or the like. The positive electrode active material and the negative electrode active material may be capable of efficiently intercalating and deintercalating lithium ions.

There is no clear discrimination between the active materials that form the positive electrode active material layer 32 or the negative electrode active material layer 42, and it is possible to compare the potentials of two kinds of compounds, use the compound exhibiting a higher potential as the positive electrode active material, and use the compound exhibiting a lower potential as the negative electrode active material. In addition, the same compound may be used in the positive electrode active material layer 32 and the negative electrode active material layer 42 as long as the compound is capable of emitting lithium ions and absorbing lithium ions at the same time. Therefore, hereinafter, active materials will be collectively described.

As the active materials, it is possible to use transition metal oxides, transition metal complex oxides, and the like. Examples of the transition metal oxides and the transition metal complex oxides include lithium manganese complex oxides $Li_2Mn_aMa_{1-a}O_3$ (0.8≤a≤1, Ma=Co, Ni), lithium cobalt oxide ($LiCoO_2$), lithium nickel oxide ($LiNiO_2$), lithium manganese spinel ($LiMn_2O_4$), complex metal oxides represented by General Formula: $LiNi_xCo_yMn_zO_2$ (x+y+z=1, 0≤x≤1, 0≤y≤1, 0≤z≤1), a lithium vanadium compound ($LiV_2O_5$), olivine-type $LiM_bPO_4$ (here, $M_b$ is one or more elements selected from Co, Ni, Mn, Fe, Mg, Nb, Ti, Al, and Zr), lithium vanadium phosphate ($Li_3V_2(PO_4)_3$ or $LiVOPO_4$), Li-rich solid solution positive electrodes represented by $Li_2MnO_3$-$LiM_cO_2$ ($M_c$=Mn, Co, or Ni), lithium titanate ($Li_4Ti_5O_{12}$), complex metal oxides represented by $Li_sNi_tCo_uAl_vO_2$ (0.9<s<1.3, 0.9<t+u+v<1.1), and the like. Additionally, in addition to the above-described complex metal oxides, metals, alloys, and metal oxides such as metallic Li, an Li—Al alloy, an Li—In alloy, carbon, silicon (Si), silicon oxides ($SiO_x$), and titanium oxide ($TiO_2$) are exemplified.

As the active materials of the present embodiment, a phosphate compound may be contained as a main component, for example, any one or a plurality of lithium vanadium phosphate ($LiVOPO_4$, $Li_3V_2(PO_4)_3$, or $Li_4(VO)(PO_4)_2$), lithium vanadium pyrophosphate ($Li_2VOP_2O_7$ or $Li_2VP_2O_7$), and $Li_9V_3(P_2O_7)_3(PO_4)_2$ is preferred, and, particularly, one or both of $LiVOPO_4$ and $Li_3V_2(PO_4)_3$ are preferred.

The main component in the present embodiment refers to the fact that the percentage of the phosphate compound in all of the active materials in the active material layers is more than 50 parts by mass, and the percentage of the phosphate compound is preferably 80 parts by mass or more.

In addition, these active materials may contain a heterogeneous element substituting for a part of each element and may be changed from the stoichiometric composition. $LiVOPO_4$ and $Li_3V_2(PO_4)_3$ are preferably deficient in lithium and more preferably $Li_xVOPO_4$ (0.94≤x≤0.98) and $Li_xV_2(PO_4)_3$ (2.8≤x≤2.95).

Examples of the conductive assistant include carbon materials such as carbon black, acetylene black, ketjen black, carbon nanotubes, graphite, graphene, and activated carbon and metal materials such as gold, silver, palladium, platinum, copper, and tin.

The conductive ion auxiliary agent is, for example, a solid electrolyte. As this solid electrolyte, specifically, it is possible to use, for example, the same material as the material that is used for the solid electrolyte layer 50.

In the case of using a solid electrolyte as the conductive ion auxiliary agent, the same material as the conductive ion auxiliary agent and the solid electrolyte that is used for the solid electrolyte layer 50 may be used.

(Positive Electrode Current Collector and Negative Electrode Current Collector)

As materials that configure the positive electrode current collector layer 31 and the negative electrode current collector layer 41 of the all-solid-state battery 1 of the present embodiment, a material having a high electrical conductivity is preferably used, and, for example, silver, palladium, gold, platinum, aluminum, copper, nickel, or the like is preferably used. Particularly, copper is more preferred since copper does not easily react with lithium aluminum titanium phosphate and, furthermore, has an effect of reducing the internal resistance of the all-solid-state battery. The materials that configure the positive electrode current collector layer and the negative electrode current collector layer may be identical to or different from each other in the positive electrode and the negative electrode.

In addition, the positive electrode current collector layer 31 and the negative electrode current collector layer 41 of the all-solid-state battery 1 of the present embodiment may contain a positive electrode active material and a negative electrode active material, respectively.

When the positive electrode current collector layer 31 and the negative electrode current collector layer 41 contain a positive electrode active material and a negative electrode active material, respectively, the adhesiveness between the positive electrode current collector layer 31 and the positive electrode active material layer 32 and the adhesiveness between the negative electrode current collector layer 41 and the negative electrode active material layer 42 improve, which is desirable in some embodiments.

The ratios of the positive electrode active material and the negative electrode active material in the positive electrode current collector layer 31 and the negative electrode current collector layer 41 of the present embodiment are not particularly limited as long as the positive electrode current collector layer 31 and the negative electrode current collector layer 41 function as a current collector, but the volume ratio of the positive electrode current collector to the positive electrode active material or the negative electrode current collector to the negative electrode active material may be within a range of 90/10 to 70/30.

The material that configures the margin layer preferably contains, for example, the same material as the solid electrolyte layer 50. Therefore, a lithium ion conductor having a NASICON-type crystal structure is preferably used, and, for example, a solid electrolyte material represented by LiTi$_2$(PO$_4$)$_3$ (LTP), LiZr$_2$(PO$_4$)$_3$ (LZP), Li$_{1+x}$Al$_x$Ti$_{2-x}$(PO$_4$)$_3$ (LATP, 0<x≤0.6)), Li$_{1+x}$Al$_x$Ge$_{2-x}$(PO$_4$)$_3$ (LAGP, 0<x≤0.6), or Li$_{1+x}$Y$_x$Zr$_{2-x}$(PO$_4$)$_3$ (LYZP, 0<x≤0.6) may be contained.

(Method for Manufacturing of all-Solid-State Battery)

The all-solid-state battery 1 of the present embodiment can be manufactured in the following order as an example. Individual materials of the positive electrode current collector layer, the positive electrode active material layer, the solid electrolyte layer, the negative electrode active material layer, the negative electrode current collector layer, the margin layer, and an organic material for forming void are made into pastes. The method for making the pastes is not particularly limited, and it is possible to obtain the pastes by, for example, mixing the powders of the individual materials into vehicles. Here, the vehicle is a collective term for media in a liquid phase and includes a solvent, a binder, and the like. A binder that is contained in pastes for molding a green sheet or a printed layer is not particularly limited, it is possible to use, for example, a polyvinyl acetal resin, a cellulose resin, an acrylic resin, an urethane resin, a vinyl acetate resin, a polyvinyl alcohol resin, or the like. A slurry can contain, for example, at least one of these resins.

In addition, the pastes may contain a plasticizer. The kind of the plasticizer is not particularly limited, and phthalate esters such as dioctyl phthalate and diisononyl phthalate or the like may be used.

By such a method, a paste for the positive electrode current collector layer, a paste for the positive electrode active material layer, a paste for the solid electrolyte layer, a paste for the negative electrode active material layer, a paste for the negative electrode current collector layer, a paste for the margin layer, and an organic material paste are produced.

A green sheet for the solid electrolyte is produced by applying the paste for the solid electrolyte layer produced above on a base material of polyethylene terephthalate (PET) or the like in a desired thickness and drying the paste as necessary. The method for producing the green sheet for the solid electrolyte is not particularly limited, and it is possible to adopt a well-known method such as a doctor blade method, a die coater, a comma coater, or a gravure coater. Next, the positive electrode active material layer 32, the positive electrode current collector layer 31, and the positive electrode active material layer 32 are sequentially printed by screen printing and laminated on the green sheet for the solid electrolyte, thereby forming the positive electrode layer 30. Furthermore, in order to bury the length difference between the green sheet for the solid electrolyte and the positive electrode layer 30, the margin layer 80 is formed by screen printing in a region other than the positive electrode layer 30, thereby producing a positive electrode layer unit. In order to form a void adjacent to one end of the positive electrode current collector layer, the void 90 is preferably formed using the organic material paste between the positive electrode current collector layer 31 and the margin layer 80.

The composition of the organic material paste is not particularly limited, but preferably contains a large amount of, for example, an organic component that is thermally decomposed by debinding or firing in some embodiments. As the organic material paste, it is possible to divert the paste for the margin layer or to preferably use a paste containing 1% to 100% by mass as the organic component. As the organic component, a binder, an organic solvent, and, additionally, a void-forming agent may be contained. As the void-forming agent, a material that has a low melting point and does not leave any residues after debinding or firing is preferred in some embodiments, and, it is possible to use, for example, the particles of polymethyl methacrylate (PMMA), polyphenylene sulfide, styrene butadiene rubber (SBR), polyethylene (PE), polyamide-imide, polyvinylidene fluoride, polyacrylic acid, carbon beads, albumin, or the like. Regarding the particle sizes of the void-forming agent, a void-forming agent having a fine particle shape is preferred, and it is possible to preferably use a void-forming agent having particle sizes of approximately 10 nm to 5 μm.

A negative electrode layer unit can also be produced by the same method as the positive electrode layer unit, and the negative electrode layer 40 and the margin layer are formed on the green sheet for the solid electrolyte by screen printing, thereby producing the negative electrode layer unit. In order to form the void 90 adjacent to one end of the negative electrode current collector layer 41, it is preferable to form the void 90 using the organic material paste between the negative electrode current collector layer 41 and the margin layer 80.

In addition, the positive electrode layer unit and the negative electrode layer unit are alternately laminated to be offset such that one end of the positive electrode layer unit and one end of the negative electrode layer unit do not match each other, and furthermore, it is possible to provide external layers (cover layers) on both main surfaces of the laminated body as necessary. When the external layers are laminated, a laminate substrate in which a plurality of elements of the all-solid-state battery is included is produced. For the external layers, it is possible to use the same material as the solid electrolyte, and it is possible to use the green sheet for the solid electrolyte.

The above-described manufacturing method is designed to produce a parallel-type all-solid-state battery, and, in a method for manufacturing a serial-type all-solid-state battery, the positive electrode layer unit and the negative electrode layer unit may be laminated such that one end of the positive electrode layer 30 and one end of the negative electrode layer 40 match each other, that is, are not offset.

Furthermore, it is possible to enhance adhesiveness by collectively pressurizing the produced laminate substrates by metal mold pressing, warm isostatic pressing (WIP), cold isostatic pressing (CIP), isostatic pressing, or the like. The laminate substrates are preferably pressurized while being heated and can be pressurized at, for example, 40° C. to 95° C.

The produced laminate substrates are cut into chips using a dicing device and then subjected to debinding and firing, thereby producing the laminated body of the all-solid-state battery.

Regarding the debinding and the firing, it is possible to perform firing, for example, in a nitrogen atmosphere at a temperature of 600° C. to 1000° C. The retention times during the debinding and the firing are set to, for example, 0.1 to six hours. Due to the debinding and the firing, the organic component used as the paste for the organic material disappears, and the void 90 can be formed. Individual conditions for the debinding and the firing are not limited to what has been described above as long as the void 90 is formed.

The average cross-sectional area $S_x$ of the void in the cross section which is the same direction as the lamination direction and parallel to the extending end can be controlled by, for example, the size of a region formed using the organic material paste before the debinding and the firing. Regarding the region, as an example, the thickness (the width in the vertical direction in FIG. 2) can be set to 1 μm to 5 μm, and the width (the width in the horizontal direction in FIG. 2) can be to 1 μm to 100 μm, but the thickness and the width are not limited thereto.

Furthermore, in order to efficiently extract currents from the laminated body of the all-solid-state battery, it is possible to provide the positive electrode outer electrode 60 and the negative electrode outer electrode 70. The positive electrode outer electrode 60 is connected to one end of the positive electrode layer 30 extending on the end surface of the laminated body 20, and the negative electrode outer electrode 70 is connected to the end of the negative electrode layer 40 extending on one end surface of the laminated body 20, respectively. Therefore, the positive electrode outer electrode 60 and the negative electrode outer electrode 70 are formed so as to clamp the end surfaces of the laminated body 20. Examples of the method for forming the positive electrode outer electrode 60 and the negative electrode outer electrode 70 include a sputtering method, a screen printing method, a dip coating method, and the like. In the screen printing method and the dip coating method, pastes for the outer electrodes containing metal powder, a resin, and a solvent are produced, and the positive electrode outer electrode 60 and the negative electrode outer electrode 70 are formed using these pastes. Next, a baking step for burning away the solvent and a plating processing for forming terminal electrodes on the surfaces of the positive electrode outer electrode 60 and the negative electrode outer electrode 70 are performed. In the sputtering method, since it is possible to directly form the positive electrode outer electrode 60, the negative electrode outer electrode 70, and terminal electrodes, the baking step and the plating processing step become unnecessary.

The laminated body of the all-solid-state battery 1 may be sealed in, for example, a coin cell in order to enhance the moisture resistance and the impact resistance. The sealing method is not particularly limited, and, for example, a fired laminated body may be sealed with a resin. In addition, the laminated body may be sealed by coating or dip-coating the circumference of the laminated body with an insulating paste having an insulating property such as $Al_2O_3$ and thermally treating this insulating paste.

Second Embodiment

Next, an all-solid-state battery according to a second embodiment of the present disclosure will be described. In the description of the second embodiment, the same configuration as in the all-solid-state battery 1 of the first embodiment will be given the same reference sign and will not be described again.

Figure 3:
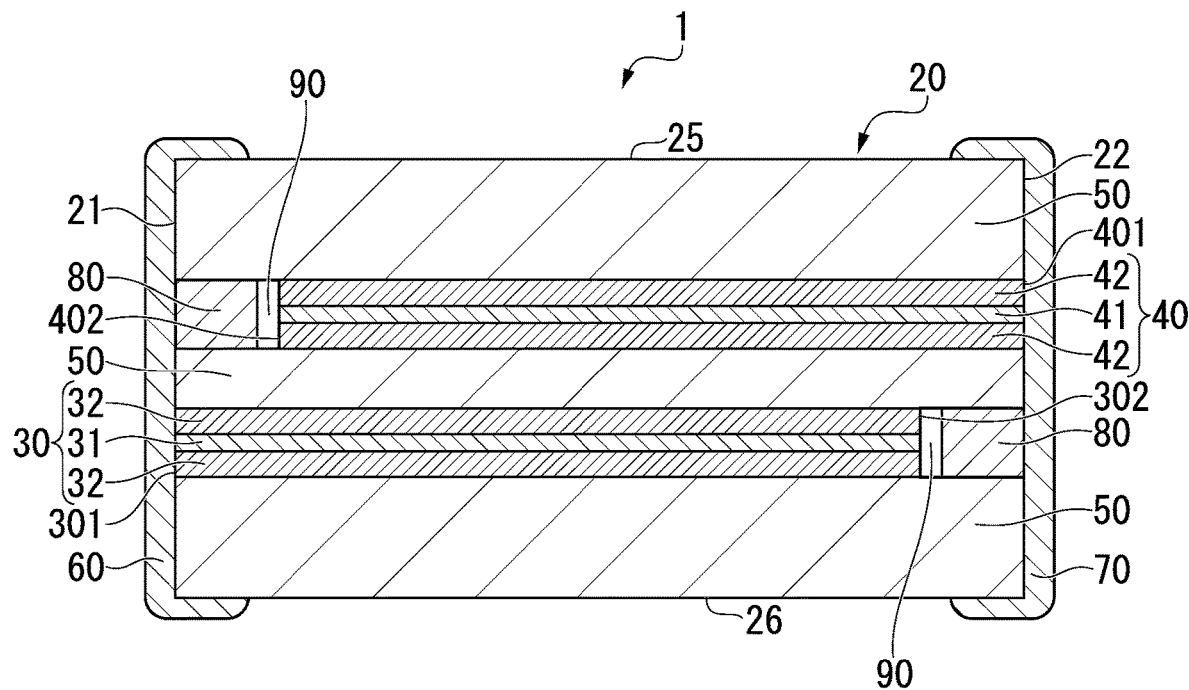
FIG. 3 is a cross-sectional view parallel to the third lateral face 23 showing the configuration of an all-solid-state battery according to a second embodiment of the present disclosure.

As shown in FIG. 3, the present embodiment is different from the first embodiment in the fact that the voids 90 are adjacent to the entire "non-extending regions" of the positive electrode layer 30 and the negative electrode layer 40 and are adjacent to the solid electrolyte layers 50 above and below. Even with such a configuration, it is possible to provide an all-solid-state battery in which stress loading attributed to volume expansion is relaxed in the same manner as in the first embodiment and, furthermore, the cycle characteristics are excellent.

Third Embodiment

Next, an all-solid-state battery according to a third embodiment of the present disclosure will be described. In the description of the third embodiment, the same configuration as in the all-solid-state battery 1 of the first embodiment will be given the same reference sign and will not be described again.

Figure 4:
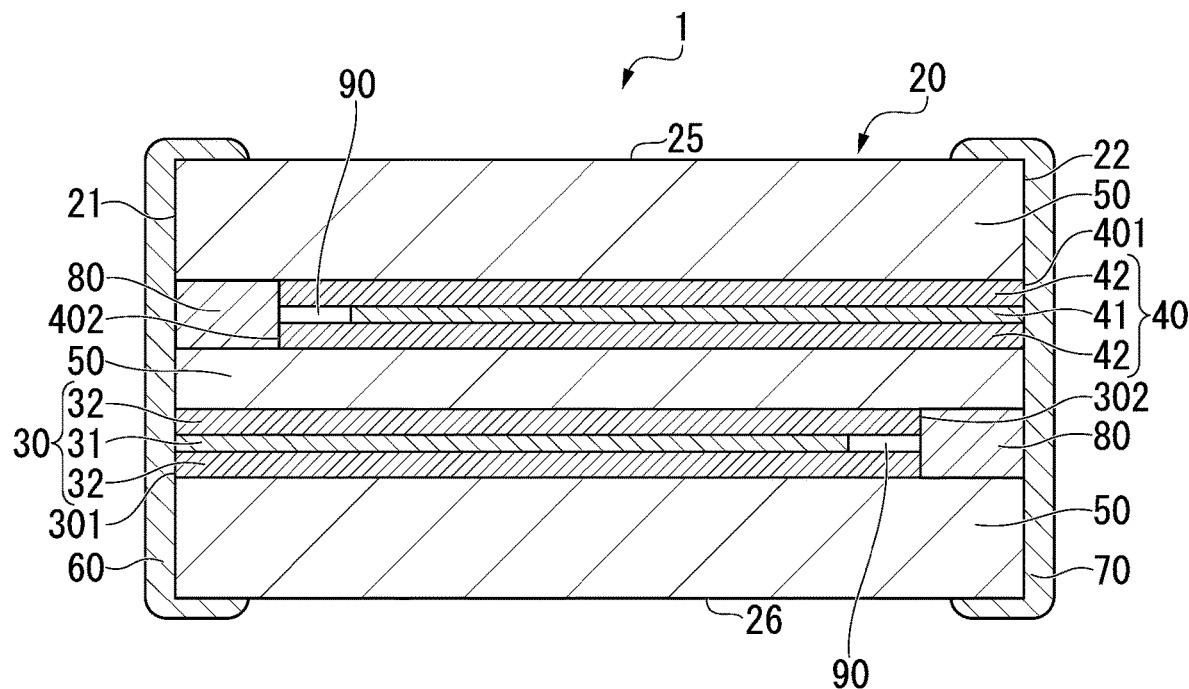
FIG. 4 is a cross-sectional view parallel to the third lateral face 23 showing the configuration of an all-solid-state battery according to a third embodiment of the present disclosure.

As shown in FIG. 4, the present embodiment is identical to the first embodiment in the fact that the voids 90 are adjacent to the positive electrode current collector layer 31 and the negative electrode current collector layer 41 in the "non-extending regions" of the positive electrode layer 30 and the negative electrode layer 40, but is different from the first embodiment in the fact that the voids 90 are adjacent to the positive electrode current collectors 32 and the negative electrode active material layers 42 above and below. Even with such a configuration, it is possible to provide an all-solid-state battery in which stress loading attributed to volume expansion is relaxed in the same manner as in the first embodiment and, furthermore, the cycle characteristics are excellent.

Fourth Embodiment

Next, an all-solid-state battery according to a fourth embodiment of the present disclosure will be described. In the description of the fourth embodiment, the same configuration as in the all-solid-state battery 1 of the first embodiment will be given the same reference sign and will not be described again.

Figure 5:
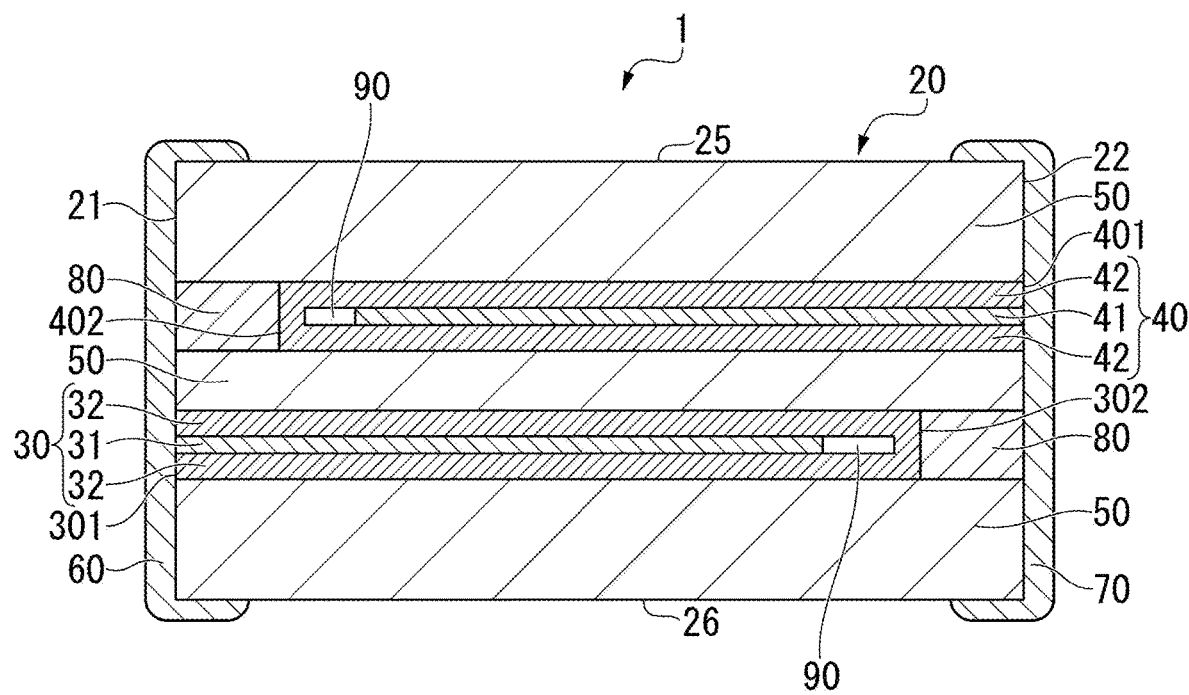
FIG. 5 is a cross-sectional view parallel to the third lateral face 23 showing the configuration of an all-solid-state battery according to a fourth embodiment of the present disclosure.

As shown in FIG. 5, in the present embodiment, in the "non-extending regions", the positive electrode active material layers 32 formed on both main surfaces of the positive electrode current collector layer 31 are coupled with each other, and the negative electrode active material layers 42 formed on both main surfaces of the negative electrode current collector layer 41 are coupled with each other. Therefore, the positive electrode current collector layer 31 and the negative electrode current collector layer 41 are not exposed, and, instead, the "non-extending regions" are formed of the positive electrode active material layers 32 and the negative electrode active material layers 42, which is different from the first embodiment.

In addition, the voids 90 in the present embodiment are formed in at least a part of a region surrounded by the positive electrode current collector layer 31 and the positive electrode active material layers 32 and at least a part of a region surrounded by the negative electrode current collector layer 41 and the negative electrode active material layers 42, respectively, which is different from the first embodiment. In other words, in the present embodiment, the voids 90 are not adjacent to the margin layers 80, but are adjacent to the positive electrode current collector layer 31 and the positive electrode active material layers 32 and adjacent to the negative electrode current collector layer 41 and the negative electrode active material layers 42, respectively. Even with such a configuration, it is possible to provide an all-solid-state battery in which stress loading attributed to volume expansion is relaxed in the same manner as in the first embodiment and, furthermore, the cycle characteristics are excellent.

Hitherto, the embodiments of the present disclosure have been described, but the present disclosure is not limited to these embodiments and can be modified in a variety of manners.

EXAMPLES

Hereinafter, the present disclosure will be further described in more detail using examples and comparative examples based on the above-described embodiments, but the present disclosure is not limited to these examples. "Parts" indicating the amounts of materials prepared in the production of pastes refers to "parts by mass" unless particularly otherwise described.

Example 1

(Production of Positive Electrode Active Material and Negative Electrode Active Material)

As a positive electrode active material and a negative electrode active material, $Li_3V_2(PO_4)_3$ produced by the following method was used. As the production method, $Li_2CO_3$, $V_2O_5$, and $NH_4H_2PO_4$ were used as starting materials, mixed in a wet manner with a ball mill for 16 hours, dehydrated, and dried to obtain powder. The powder was calcined in a nitrogen and hydrogen-mixed atmosphere at 850° C. for two hours. The calcined product was ground in a wet manner with the ball mill, then, dehydrated, and dried to obtain positive electrode active material powder and negative electrode active material powder. The fact that the compositions of these produced powders were $Li_3V_2(PO_4)_3$ was confirmed using an X-ray diffraction device.

(Production of Paste for Positive Electrode Active Material Layer and Paste for Negative Electrode Active Material Layer)

As a paste for a positive electrode active material layer and a paste for a negative electrode active material layer, ethyl cellulose (15 parts) as a binder and dihydroterpineol (65 parts) as a solvent were added to 100 parts of the powder of $Li_3V_2(PO_4)_3$, mixed, and dispersed, thereby producing both the paste for a positive electrode active material layer and a paste for a negative electrode active material layer.

(Production of Paste for Solid Electrolyte Layer)

As a solid electrolyte, $Li_{1.3}Al_{0.3}Ti_{1.7}(PO_4)_3$ produced by the following method was used. $Li_2CO_3$, $Al_2O_3$, $TiO_2$, and $NH_4H_2PO_4$ were used as starting materials, mixed in a wet manner with the ball mill for 16 hours, then, dehydrated, and dried to obtain powder. Next, the obtained powder was calcined in the atmosphere at 800° C. for two hours. After calcination, the calcined powder was ground in a wet manner with the ball mill for 16 hours, then, dehydrated, and dried to obtain the powder of the solid electrolyte. The fact that the composition of the produced powder was $Li_{1.3}Al_{0.3}Ti_{1.7}(PO_4)_3$ was confirmed using the X-ray diffraction device (XRD).

Next, ethanol (100 parts) and toluene (200 parts) were added as solvents to this powder and mixed in a wet manner with the ball mill. After that, a polyvinyl butyral-based binder (16 parts) and benzyl butyl phthalate (4.8 parts) were further injected thereinto and mixed, thereby preparing a paste for a solid electrolyte layer.

(Production of Sheet for Solid Electrolyte Layer)

The paste for a solid electrolyte layer was molded into a sheet on a PET film as a base material by the doctor blade method, and a 15 μm-thick sheet for a solid electrolyte layer was obtained.

(Production of Paste for Positive Electrode Current Collector Layer and Paste for Negative Electrode Current Collector Layer)

As a positive electrode current collector and a negative electrode current collector, Cu and $Li_3V_2(PO_4)_3$ were mixed together such that the volume ratio reached 80/20, and ethyl cellulose (10 parts) as a binder and dihydroterpineol (50 parts) as a solvent were added thereto, mixed, and dispersed, thereby producing a paste for a positive electrode current collector layer and a paste for a negative electrode current collector layer.

(Production of Paste for Margin Layer)

As a paste for a margin layer, ethanol (100 parts) and toluene (100 parts) were added as solvents to the powder of $Li_{1.3}Al_{0.3}Ti_{1.7}(PO_4)_3$ and mixed in a wet manner with the ball mill, next, a polyvinyl butyral-based binder (16 parts) and benzyl butyl phthalate (4.8 parts) were further injected thereinto, mixed and dispersed, thereby producing the paste for a margin layer.

(Production of Organic Material Paste)

As an organic material paste, ethanol (100 parts) and toluene (100 parts) were added as solvents to the powder of PMMA having a particle diameter of 200 nm and mixed in a wet manner with the ball mill. Next, a polyvinyl butyral-based binder (16 parts) and benzyl butyl phthalate (4.8 parts) were added thereto, mixed, and dispersed, thereby producing the organic material paste.

(Production of Outer Electrode Paste)

Silver powder, an epoxy resin, and a solvent were mixed together and dispersed, thereby producing a thermoset-type outer electrode paste.

An all-solid-state battery was produced as described below using these pastes.

(Production of Positive Electrode Layer Unit)

A 5 μm-thick positive electrode active material layer (referred to as the first positive electrode active material layer) was formed on the sheet for a solid electrolyte layer using screen printing and dried at 80° C. for 10 minutes. Next, a 5 μm-thick positive electrode current collector layer was formed thereon using screen printing and dried at 80° C. for 10 minutes. Furthermore, a 5 μm-thick positive electrode active material layer (referred to as the second positive electrode active material layer) was formed again thereon using screen printing and dried at 80° C. for 10 minutes, thereby producing a positive electrode layer on the sheet for a solid electrolyte layer. Next, a margin layer was formed at the outer circumference of one end of a positive electrode layer (three sides of the positive electrode layer on a second lateral face side, a third lateral face side, and a fourth lateral face side) using screen printing so as to become flush with the planes of the first positive electrode active material layer and dried at 80° C. for 10 minutes. Furthermore, a region containing an organic material was formed on the margin layer in a thickness of 1.2 μm and a width of 1.2 μm using the organic material paste and dried at 80° C. for 10 minutes. Furthermore, a margin layer was formed to become flush with the planes of the second positive electrode active material layer so as to cover the region containing the organic material and dried at 80° C. for 10 minutes. Next, the PET film was peeled off, thereby obtaining a sheet of a positive electrode layer unit. The region containing the organic material was formed to form a void by being thermally decomposed in a firing step.

(Production of Negative Electrode Layer Unit)

A 5 μm-thick negative electrode active material layer (referred to as the first negative electrode active material layer) was formed on the sheet for a solid electrolyte layer using screen printing and dried at 80° C. for 10 minutes. Next, a 5 μm-thick negative electrode current collector layer was formed thereon using screen printing and dried at 80° C. for 10 minutes. Furthermore, a 5 μm-thick negative electrode active material layer (referred to as the second negative electrode active material layer) was formed again thereon using screen printing and dried at 80° C. for 10 minutes, thereby producing a negative electrode layer on the sheet for a solid electrolyte layer. Next, a margin layer was formed at the outer circumference of one end of the negative electrode layer (three sides of the negative electrode layer on a first lateral face side, a third lateral face side, and a fourth lateral face side) using screen printing so as to become flush with the planes of the first negative electrode active material layer and dried at 80° C. for 10 minutes. Furthermore, a region containing an organic material was formed on the margin layer in a thickness of 1.2 μm and a width of 1.2 μm using the organic material paste and dried at 80° C. for 10 minutes. Furthermore, a margin layer was formed to become flush with the planes of the second negative electrode active material layer so as to cover the region containing the organic material and dried at 80° C. for 10 minutes. Next, the PET film was peeled off, thereby obtaining a sheet of a negative electrode layer unit. The region containing the organic material was formed to form a void by being thermally decomposed in a firing step.

(Production of Laminated Body)

Three positive electrode layer units and three negative electrode layer units were prepared, respectively, and alternately laminated in the order of the positive electrode layer unit and the negative electrode layer unit to be offset such that the respective electrode layer units do not match at one end, thereby producing a laminate substrate. Furthermore, a plurality of solid electrolyte sheets was laminated as external layers on both main surfaces of the laminate substrate to provide 500 μm-thick external layers. The outer layers were bonded by thermal compression with a mold press and then cut, thereby producing an unfired laminated body of an all-solid-state battery. Next, the unfired laminated body was debinded fired, thereby producing a laminated body of an all-solid-state battery. In the firing, the temperature was raised up to a firing temperature of 850° C. at a temperature rise rate of 200° C./hour in nitrogen, and the laminated body was held at the firing temperature for two hours, naturally cooled, and then removed.

(Outer Electrode Formation Step)

The outer electrode paste was applied to end surfaces (a first lateral face and a second lateral face) of the fired laminated body of an all-solid-state battery and thermally cured at 150° C. for 30 minutes, thereby forming a pair of outer electrodes.

Comparative Example 1

An all-solid-state battery according to Comparative Example 1 was produced in the same manner as in Example 1 except that, in the production of the positive electrode layer unit and the negative electrode layer unit, the regions containing the organic material, for which the organic material paste was used, were not formed in the margin layers, and, in the fired all-solid-state battery, the voids were not provided.

Examples 2 to 11

All-solid-state batteries of Examples 2 to 11 were produced in the same manner as in Example 1 except that the content of PMMA contained in the organic material paste was adjusted such that the void sizes were adjusted to become a void size shown in Table 1.

Examples 12 and 13

An all-solid-state battery according to Example 12 was produced in the same manner as in Example 5 except that the region containing the organic material, for which the organic material paste was used, was formed only in the margin layer of the positive electrode unit, whereby adjustment was made such that a void was formed only at one end of the positive electrode layer (three sides of the positive electrode layer on the second lateral face side, the third lateral face side, and the fourth lateral face side).

An all-solid-state battery according to Example 13 was produced in the same manner as in Example 5 except that the region containing the organic material, for which the organic material paste was used, was formed only in the margin layer of the negative electrode unit, whereby adjustment was made such that a void was formed only at one end of the negative electrode layer (three sides of the negative electrode layer on the first lateral face side, the third lateral face side, and the fourth lateral face side).

Examples 14 to 16

An all-solid-state battery according to Example 14 was produced in the same manner as in Example 1 except that, in the production of the positive electrode unit and the negative electrode unit, the region containing the organic material, for which the organic material paste was used, was formed only at one end of each electrode layer that was parallel to the third lateral face and the fourth lateral face (refer to FIG. 2) and did not extend on a lateral face of the laminated body (two sides of the positive electrode layer on the third lateral face side and the fourth lateral face side or two sides of the negative electrode layer on the third lateral face side and the fourth lateral face side).

An all-solid-state battery according to Example 15 was produced in the same manner as in Example 6 except that, in the production of the positive electrode unit and the negative electrode unit, the region containing the organic material, for which the organic material paste was used, was formed only at one end of each electrode layer that was parallel to the third lateral face and the fourth lateral face and did not extend on a lateral face of the laminated body (two sides of the positive electrode layer on the third lateral face side and the fourth lateral face side or two sides of the negative electrode layer on the third lateral face side and the fourth lateral face side).

An all-solid-state battery according to Example 16 was produced in the same manner as in Example 10 except that, in the production of the positive electrode unit and the negative electrode unit, the region containing the organic material, for which the organic material paste was used, was formed only at one end of each electrode layer that was parallel to the third lateral face and the fourth lateral face and did not extend on a lateral face of the laminated body (two sides of the positive electrode layer on the third lateral face side and the fourth lateral face side or two sides of the negative electrode layer on the third lateral face side and the fourth lateral face side).

Examples 17 to 19

An all-solid-state battery according to Example 17 was produced in the same manner as in Example 1 except that, in the production of the positive electrode unit and the negative electrode unit, the region containing the organic material, for which the organic material paste was used, was formed only at one end of each electrode layer that was parallel to the first lateral face or the second lateral face (refer to FIG. 1) and did not extend on a lateral face of the laminated body (one side of the positive electrode layer on the second lateral face side or one side of the negative electrode layer on the first lateral face side).

An all-solid-state battery according to Example 18 was produced in the same manner as in Example 6 except that, in the production of the positive electrode unit and the negative electrode unit, the region containing the organic material, for which the organic material paste was used, was formed only at one end of each electrode layer that was parallel to the first lateral face or the second lateral face and did not extend on a lateral face of the laminated body (one side of the positive electrode layer on the second lateral face side or one side of the negative electrode layer on the first lateral face side).

An all-solid-state battery according to Example 19 was produced in the same manner as in Example 10 except that, in the production of the positive electrode unit and the negative electrode unit, the region containing the organic material, for which the organic material paste was used, was formed only at one end of each electrode layer that was parallel to the first lateral face or the second lateral face and did not extend on a lateral face of the laminated body (one side of the positive electrode layer on the second lateral face side or one side of the negative electrode layer on the first lateral face side).

(Evaluation of Voids)

The voids included in the all-solid-state batteries produced in the present examples and the comparative examples can be evaluated, for example, as described below.

[Calculation of Cross-Sectional Area of Void by FE-SEM Observation]

From each of the all-solid-state batteries produced in the examples and the comparative examples, five samples were collected, embedded in a thermosetting resin, and dried at 60° C. for one hour. A cross section parallel to the first lateral face (second lateral face) of the all-solid-state battery embedded in the resin was made to appear with an automatic rotary polisher, and furthermore, the cross section was etched using a flat milling (HM-3000: manufactured by Hitachi High-Tech Corporation). The samples were irradiated with Ar ion beams while being rotated under conditions of an accelerating voltage of 6 V, an Ar gas flow of 0.07 cm$^3$/min, an inclination angle of 85°, a degree of eccentricity of 4 mm, and a treatment time of 10 minutes.

Au sputtering was performed on the sample having the cross section made to appear for two minutes, one end of the positive electrode layer and one end of the negative electrode layer were all observed in a backscattered electron image (COMPO image) using an FE-SEM (S-4700; manufactured by Hitachi, Ltd.), and the number of voids adjacent to the ends, the major axes and minor axes of all of the voids adjacent to the ends were measured. In addition, the average major axis and average minor axis of the voids were calculated from the following expressions.

Average major axis (μm)=total of major axes of all voids observed to be adjacent to one end of positive electrode layer and one end of negative electrode layer/number of observed voids Average minor axis (μm)=total of minor axes of all voids observed to be adjacent to one end of positive electrode layer and one end of negative electrode layer/number of observed voids Next, the cross-sectional areas of the voids were calculated as described below. A cross-sectional photograph of the observed COMPO image was image-processed to be monochromatic (binarization) by image processing to show the voids black and the other regions white, and the numbers of pixels were calculated, respectively. Voids that were not adjacent to one end of the positive electrode layer or the negative electrode layer were processed as the other regions (white). Since the total number of the black pixels and the white pixels corresponded to the area of the observed regions, the area per pixel was calculated, and the cross-sectional area of the voids was calculated from the following expression.

Cross-sectional area (μm$^2$) of voids=number of black pixels×area of one pixel (μm$^2$/pixel).

The cross-sectional areas of the voids adjacent to one end of the positive electrode layer and one end of the negative electrode layer were calculated, respectively, using the above-described method, and the average cross-sectional area $S_x$ of the voids was calculated from the following expression.

{Average cross-sectional area $S_x$ (μm$^2$) of voids}= (total of cross-sectional areas of all voids observed/number of all voids observed)

Next, regarding the cross-sectional areas of the positive electrode current collector layer and the negative electrode current collector layer, the average cross-sectional area $S_y$ of the positive electrode current collector layer and the negative electrode current collector layer (hereinafter, the average cross-sectional area of the current collector layers of the positive and negative electrodes) was also calculated from the following expression by the same image processing. In the image processing of the positive electrode current collector layer and the negative electrode current collector layer, the image was processed to be monochromatic to show the positive electrode current collector layer and the negative electrode current collector layer white and the other regions black.

{Average cross-sectional area $S_y$ (μm$^2$) of current collector layers of positive and negative electrodes}=(sum of cross-sectional areas of current collector layers of positive and negative electrodes/number of layers of positive and negative electrode current collector layers)

In addition, the ratio ($S_x/S_y$) of the cross-sectional area of the voids to the cross-sectional area of the positive and negative electrode current collector layers was calculated from the following expression.

($S_x/S_y$)={average cross-sectional area (μm$^2$) of voids/ average cross-sectional area (μm$^2$) of positive and negative electrode current collector layers}

(Battery Evaluation)

The all-solid-state batteries produced in the present examples and the comparative examples were evaluated regarding the following battery characteristics.

[Charge and Discharge Cycle Test]

The charge and discharge cycle characteristic of the all-solid-state battery produced in the present Example 1 was evaluated under charging and discharging conditions described below. As the notation of charge and discharge current, hereinafter, C rate notations will be used. The C rate is expressed as nC (μA) (n is a numerical value) and means a current with which the nominal capacity (μAh) can be charged and discharged for 1/n (h). For example, 1 C is a charge and discharge current with which the nominal capacity can be charged for 1 h, and 2 C refers to a charge and discharge current with which the nominal capacity can be charged for 0.5 h. For example, in the case of an all-solid-state battery having a nominal capacity of 100 μAh, a current of 0.1 C is 10 μA (calculation expression: 100 μA×0.1=10 μA). Similarly, a current of 0.2 C is 20 μA, and a current of 1 C is 100 μA.

The charge and discharge cycle test conditions were that the all-solid-state battery was constant-current-charged (CC charging) in an environment of 25° C. at a constant current of 0.2 C rate until a battery voltage of 1.6 V was reached and then discharged at a constant current of 0.2 C rate (CC discharging) until a battery voltage of 0 V was reached. The above-described charging and discharging were defined as one cycle, and the discharge capacity retention rate after repeating 1000 cycles of charging and discharging was evaluated as the charge and discharge cycle characteristic. The charge and discharge cycle characteristic was calculated by the following calculation expression.

Discharge capacity retention rate (%) after 1000 cycles=(discharge capacity after 1000 cycles÷discharge capacity after first cycle)×100

(Results)

Figure 6:
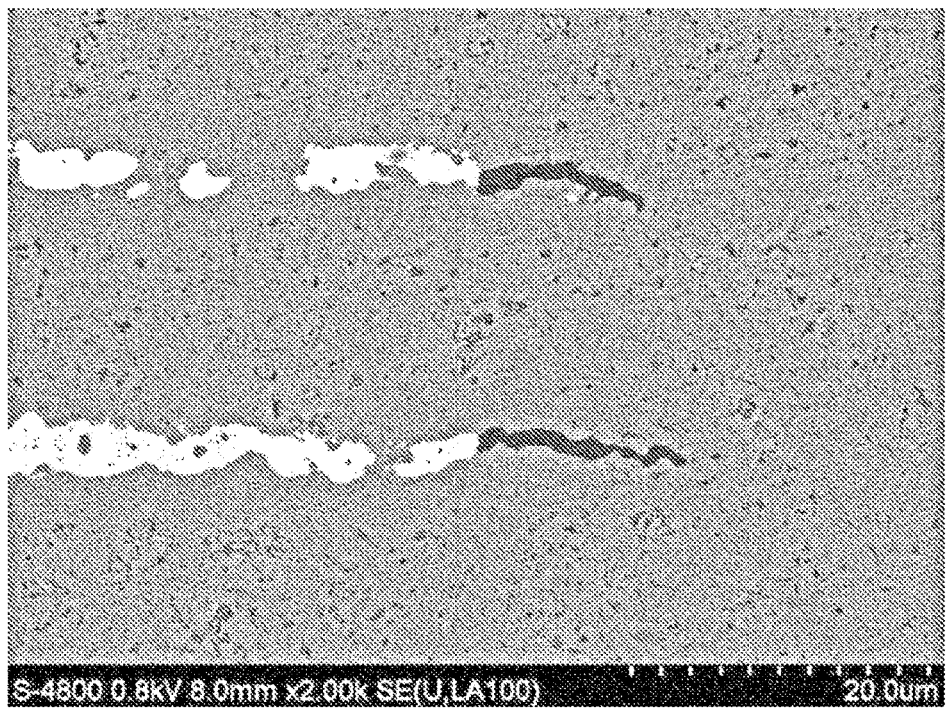
FIG. 6 is a cross-sectional FE-SEM photograph of an all-solid-state battery according to Example 5.
Figure 7:
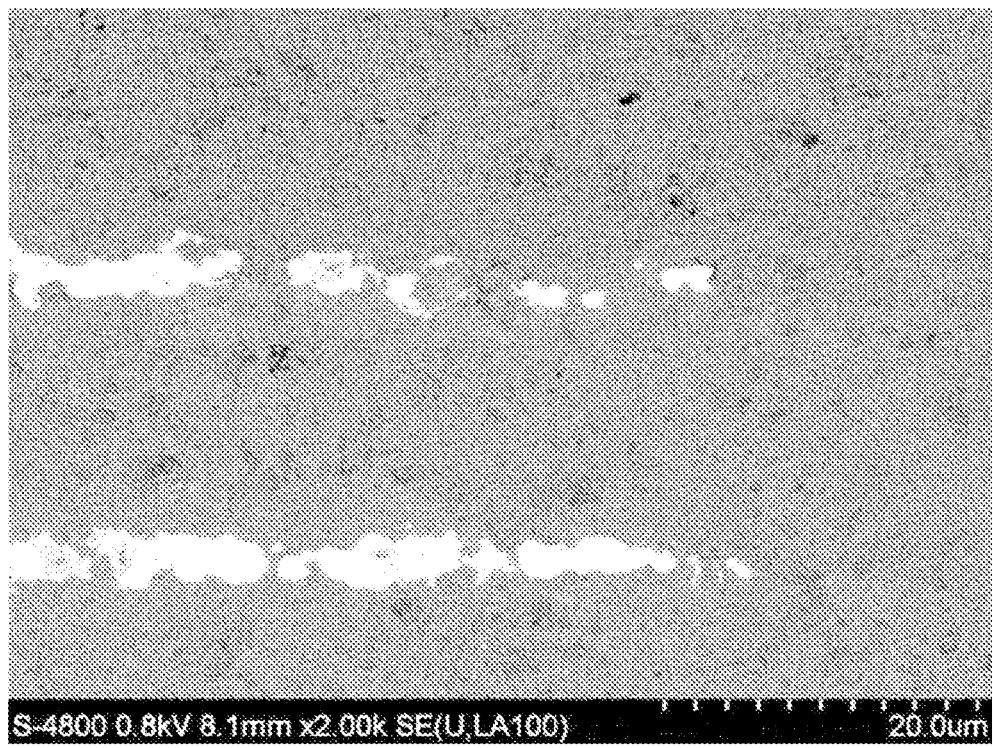
FIG. 7 is a cross-sectional FE-SEM photograph of an all-solid-state battery according to Comparative Example 1.

As representative examples, the FE-SEM photographs of cross sections parallel to the first lateral faces (second lateral faces) of the all-solid-state batteries according to Example 6 and Comparative Example 1 are shown in FIG. 6 and FIG. 7. In the cross-sectional photograph of FIG. 6 according to Example 6, it was confirmed that voids were formed at one end of the positive electrode layer and one end of the negative electrode layer that were parallel to the third lateral face and did not extend on the lateral faces.

On the other hand, in the cross-sectional photograph of FIG. 7 according to Comparative Example 1, it was confirmed that voids were not formed at one end of the positive electrode layer and one end of the negative electrode layer that were parallel to the third lateral face and did not extend on the lateral faces of the laminated body. While not shown in the drawings, in the all-solid-state battery according to Example 6, it was confirmed that voids were also formed at one end of the positive electrode layer and one end of the negative electrode layer that were parallel to the fourth lateral face and did not extend on the lateral faces. Furthermore, it was confirmed that voids were also formed at one end of the positive electrode layer and one end of the negative electrode layer that were parallel to the first lateral face or the second lateral face and did not extend on the lateral faces of the laminated body. In other words, in the positive electrode layer and the negative electrode layer of the all-solid-state battery according to Example 6, voids were observed at all of the ends that did not extend on the lateral faces.

As a result of observing cross sections of the all-solid-state batteries of Examples 1 to 5 and Examples 7 to 11 in the same manner with an SEM, voids were observed at all of the ends of the positive and negative electrode layers that did not extend on the lateral faces of the laminated body.

In the all-solid-state battery according to Example 12, voids were observed at all of the ends of the positive electrode layer that did not extend on the lateral faces. On the other hand, no voids were observed at one end of the negative electrode layer.

In the all-solid-state battery according to Example 13, voids were observed at all of the ends of the negative electrode layer that did not extend on the lateral faces. On the other hand, no voids were observed at one end of the positive electrode layer.

In the all-solid-state batteries according to Example 14 to 16, voids were formed at one end of the positive electrode layer and one end of the negative electrode layer that were parallel to the third lateral face and the fourth lateral face and did not extend on the lateral faces of the laminated body. On the other hand, no voids were confirmed at one end of the positive electrode layer and one end of the negative electrode layer that were parallel to the first lateral face or the second lateral face and did not extend on the lateral face of the laminated body.

In the all-solid-state batteries according to Example 17 to 19, voids were formed at one end of the positive electrode layer and one end of the negative electrode layer that were parallel to the first lateral face or the second lateral face and did not extend on the lateral faces of the laminated body. On the other hand, no voids were confirmed at one end of the positive electrode layer and one end of the negative electrode layer that were parallel to the third lateral face and the fourth lateral face and did not extend on the lateral faces of the laminated body.

Table 1 shows the positions of the voids observed in one end of the positive electrode layer and one end of the negative electrode layer of each of the all-solid-state batteries according to the examples and the comparative examples, the minor axes and major axes of the voids, the average cross-sectional areas $S_x$ of the voids, the cross-sectional areas $S_y$ of the current collector layers, and $S_x/S_y$. Furthermore, the results of the cycle characteristics as all-solid-state batteries are shown.

TABLE 1

|  | Places of voids | Voids | | | Current collector layer | | Cycle characteristic [%] |
|---|---|---|---|---|---|---|---|
|  |  | Average minor axis [μm] | Average major axis [μm] | Average cross-sectional area $S_x$ [μm²] | Average cross-sectional area $S_y$ [μm²] | $S_x/S_y$ |  |
| Comparative Example 1 | None | 0 | 0 | 0 | 10000 | 0.0000 | 70 |
| Example 1 | Ends of positive and negative electrode layers parallel to first lateral face and third lateral face | 1 | 1 | 1 | 10000 | 0.0001 | 77 |
| Example 2 | Ends of positive and negative electrode layers parallel to first lateral face and third lateral face | 1 | 2 | 2 | 10000 | 0.0002 | 80 |
| Example 3 | Ends of positive and negative electrode layers parallel to first lateral face and third lateral face | 2 | 3 | 6 | 10000 | 0.0006 | 84 |
| Example 4 | Ends of positive and negative electrode layers parallel to first lateral face and third lateral face | 2 | 5 | 10 | 10000 | 0.0010 | 86 |
| Example 5 | Ends of positive and negative electrode layers parallel to first lateral face and third lateral face | 2 | 10 | 20 | 10000 | 0.0020 | 86 |

TABLE 1-continued

| | | Voids | | | Current collector layer | | |
|---|---|---|---|---|---|---|---|
| | Places of voids | Average minor axis [μm] | Average major axis [μm] | Average cross-sectional area $S_x$ [μm$^2$] | Average cross-sectional area $S_y$ [μm$^2$] | $S_x/S_y$ | Cycle characteristic [%] |
| Example 6 | Ends of positive and negative electrode layers parallel to first lateral face and third lateral face | 3 | 15 | 45 | 10000 | 0.005 | 86 |
| Example 7 | Ends of positive and negative electrode layers parallel to first lateral face and third lateral face | 3 | 25 | 75 | 10000 | 0.008 | 84 |
| Example 8 | Ends of positive and negative electrode layers parallel to first lateral face and third lateral face | 3 | 33 | 99 | 10000 | 0.010 | 81 |
| Example 9 | Ends of positive and negative electrode layers parallel to first lateral face and third lateral face | 3 | 50 | 150 | 10000 | 0.015 | 80 |
| Example 10 | Ends of positive and negative electrode layers parallel to first lateral face and third lateral face | 3 | 65 | 195 | 10000 | 0.020 | 78 |
| Example 11 | Ends of positive and negative electrode layers parallel to first lateral face and third lateral face | 3 | 70 | 210 | 10000 | 0.021 | 72 |
| Example 12 | Ends of positive electrode layer parallel to first lateral face and third lateral face | 2 | 10 | 20 | 10000 | 0.002 | 83 |
| Example 13 | Ends of negative electrode layer parallel to first lateral face and third lateral face | 2 | 10 | 20 | 10000 | 0.002 | 83 |
| Example 14 | Ends of positive and negative electrode layers parallel to third lateral face (fourth lateral face) | 1 | 1 | 1 | 10000 | 0.0001 | 75 |
| Example 15 | Ends of positive and negative electrode layers parallel to third lateral face (fourth lateral face) | 3 | 15 | 45 | 10000 | 0.005 | 83 |
| Example 16 | Ends of positive and negative electrode layers parallel to third lateral face (fourth lateral face) | 3 | 65 | 195 | 10000 | 0.020 | 74 |
| Example 17 | Ends of positive and negative electrode layers parallel to first lateral face (second lateral face) | 1 | 1 | 1 | 15000 | 0.0001 | 74 |
| Example 18 | Ends of positive and negative electrode layers parallel to first lateral face (second lateral face) | 3 | 15 | 45 | 15000 | 0.003 | 82 |
| Example 19 | Ends of positive and negative electrode layers parallel to first lateral face (second lateral face) | 3 | 65 | 195 | 1500 | 0.013 | 73 |

As shown in Table 1, in the all-solid-state batteries according to Examples 1 to 11, excellent cycle characteristics were obtained compared with the all-solid-state battery according to Comparative Example 1 which did not have any voids. Particularly, when $S_x/S_y$ was set to 0.0001 to 0.020, the capacity retention rate at the 1000$^{th}$ cycle was 77% or more, and excellent cycle characteristics were obtained. Furthermore, when $S_x/S_y$ was set to 0.0006 to 0.0080, the capacity retention rate at the 1000$^{th}$ cycle was 84% or more, and superior cycle characteristics were obtained.

However, in the all-solid-state battery according to Example 11 in which $S_x/S_y$ was 0.02, the cycle characteristics slightly degraded compared with the all-solid-state batteries according to Examples 1 to 10. This is considered that the average cross-sectional area of the voids became excessive, the internal resistance of the all-solid-state battery became high, and thus the cycle characteristics degraded.

Also in the all-solid-state batteries according to Examples 12 and 13, the capacity retention rate at the 1000$^{th}$ cycle exhibited 83%, and superior cycle characteristics were obtained compared with Comparative Example 1. Therefore, it was confirmed that, in all-solid-state batteries in which voids were included at one end of one of the positive electrode layer or the negative electrode layer, the cycle characteristics improved.

Furthermore, it was also confirmed that, in the all-solid-state batteries according to Examples 14 to 19, since superior cycle characteristics were exhibited compared with Comparative Example 1, voids adjacent to at least one end of any electrode layer were included, whereby the cycle characteristics improved.

REFERENCE SIGNS LIST

1 All-solid-state battery
20 Laminated body
21 First lateral face
22 Second lateral face
23 Third lateral face
24 Fourth lateral face
25 Upper surface
26 Lower surface
30 Positive electrode layer
31 Positive electrode current collector layer
32 Positive electrode active material layer
40 Negative electrode layer
41 Negative electrode current collector layer
42 Negative electrode active material layer
50 Solid electrolyte layer
60 Positive electrode outer electrode
70 Negative electrode outer electrode
80 Margin layer
90 Void
301 First end
302 Second end
303 Third end
304 Fourth end
401 First end
402 Second end
403 Third end
404 Fourth end

The invention claimed is:
1. An all-solid-state battery comprising:
a laminated body including a battery element in which a positive electrode layer, which is disposed in a direc- tion that crosses a lamination direction, including a positive electrode current collector layer and a positive electrode active material layer and a negative electrode layer, which are disposed in the direction that crosses the lamination direction, including a negative electrode current collector layer and a negative electrode active material layer are formed on one or both main surfaces of a solid electrolyte layer;

a positive electrode outer electrode which is in contact with a first side surface of the laminated body; and a negative electrode outer electrode which is in contact with a second side surface opposite to the first side surface of the laminated body, wherein the positive electrode layer and the negative electrode layer each include one extending end on a lateral face of the laminated body and a non-extending region on lateral faces of the laminated body, are each connected to the positive electrode outer electrode and the negative electrode outer electrode through the respective extending ends, and each includes a void adjacent at least to the non-extending region, wherein the laminated body includes a margin layer provided on the same planes as each of the positive electrode layer and the negative electrode layer, and the void is provided in at least a part of the margin layer and is not with the positive electrode outer electrode and the negative electrode outer electrode.

2. The all-solid-state battery according to claim 1, wherein the void is adjacent to at least one of the positive electrode current collector layer and the negative electrode current collector layer.

3. The all-solid-state battery according to claim 1, wherein, in a cross section which is the same direction as a lamination direction of the laminated body and parallel to the extending end, when an average cross-sectional area of the void is represented by $S_x$, and an average cross-sectional area of the positive electrode current collector layer or an average cross-sectional area of the negative electrode current collector layer is represented by $S_y$, an $S_x/S_y$ ratio satisfies 0.0001 to 0.02.

4. The all-solid-state battery according to claim 3, wherein the $S_x/S_y$ ratio satisfies 0.0006 to 0.008.

5. An all-solid-state battery comprising:

a laminated body including a battery element in which a positive electrode layer including a positive electrode current collector layer and a positive electrode active material layer and a negative electrode layer including a negative electrode current collector layer and a negative electrode active material layer are formed on one or both main surfaces of a solid electrolyte layer;

a positive electrode outer electrode; and a negative electrode outer electrode, wherein the positive electrode layer and the negative electrode layer each include one extending end on a lateral face of the laminated body and a non-extending region on lateral faces of the laminated body, and are each connected to the positive electrode outer electrode and the negative electrode outer electrode through the respective extending ends, and each includes a void adjacent at least to the non-extending region, and wherein, in a cross section which is the same direction as a lamination direction of the laminated body and parallel to the extending end, when an average cross-sectional area of the void is represented by $S_x$, and an average cross-sectional area of the positive electrode current collector layer or an average cross-sectional area of the negative electrode current collector layer is represented by $S_y$, an $S_x/S_y$ ratio satisfies 0.0001 to 0.02.

6. The all-solid-state battery according to claim 5, wherein the $S_x/S_y$ ratio satisfies 0.0006 to 0.008.

* * * * *